United States Patent [19]

Gerlach

[11] Patent Number: 4,937,663
[45] Date of Patent: Jun. 26, 1990

[54] APPARATUS FOR SCANNING AND RECORDING A COLOR IMAGE HAVING A SCANNING ELEMENT WITH SCANNING PERIODS EQUAL TO THE RECIPROCAL OF THE FLICKER RATE OF A LIGHT SOURCE ILLUMINATING THE COLOR IMAGE AND A ROTATING MULTI-SEGMENT COLOR FILTER

[75] Inventor: Richard K. Gerlach, Rolling Hills Estates, Calif.

[73] Assignee: Truvel Corporation, Torrance, Calif.

[21] Appl. No.: 94,108

[22] Filed: Sep. 8, 1987

[51] Int. Cl.$^5$ .......................... H04N 1/46; H04N 9/07
[52] U.S. Cl. ........................................ 358/75; 358/42
[58] Field of Search ............................... 358/42, 75

[56] References Cited

U.S. PATENT DOCUMENTS

| | | | |
|---|---|---|---|
| 4,628,350 | 12/1986 | Aughton et al. | 358/42 |
| 4,736,251 | 4/1988 | Sasaoka | 358/75 |
| 4,737,857 | 4/1988 | Rucci et al. | 358/294 |
| 4,769,693 | 9/1988 | Kato | 358/42 |

FOREIGN PATENT DOCUMENTS

| | | | |
|---|---|---|---|
| 57-211871 | 12/1982 | Japan | 358/75 |
| 58-80965 | 5/1983 | Japan | 358/75 |

OTHER PUBLICATIONS

Ampex Corporation, *The BC-210 Studio Color Camera*, Product Literature, Jun. 1969, Four pages (unnumbered).
L. L. Niemyer, Jr., et al., "Apollo Television Cameras", *Journal of the Smpte*, Oct. 1970, vol. 79, No. 10, pp. 926–930.

*Primary Examiner*—James J. Groody
*Assistant Examiner*—Randall S. Svihla
*Attorney, Agent, or Firm*—Robert J. Schaap

[57] ABSTRACT

A scanning apparatus for scanning and recording a color image. A source of light having a certain flicker rate illuminates the color image, and a scanning element, such as a charge-coupled device, scans the color image during scanning periods to generate electrical signals which are representative of the color image. Each of the scanning periods is equal to the reciprocal of the flicker rate to eliminate effects of the flicker on the electrical signals. A color filter with different-colored filter segments located between the scanning element and the color image enables the scanning element to produce electrical signals which are representative of different colors in the color image. The color filter is rotated at a rate such that each filter segment is interposed between the scanning element and the color image for a rotation period which is greater than the reciprocal of the flicker rate. The electrical signals are integrated in the scanning element for a first period (e.g., 8.33 milliseconds) during each rotation period, and are transferred from the scanning element to a memory during a second period (e.g., 2.67 milliseconds) during each rotation period.

16 Claims, 1 Drawing Sheet

U.S. Patent    Jun. 26, 1990    4,937,663
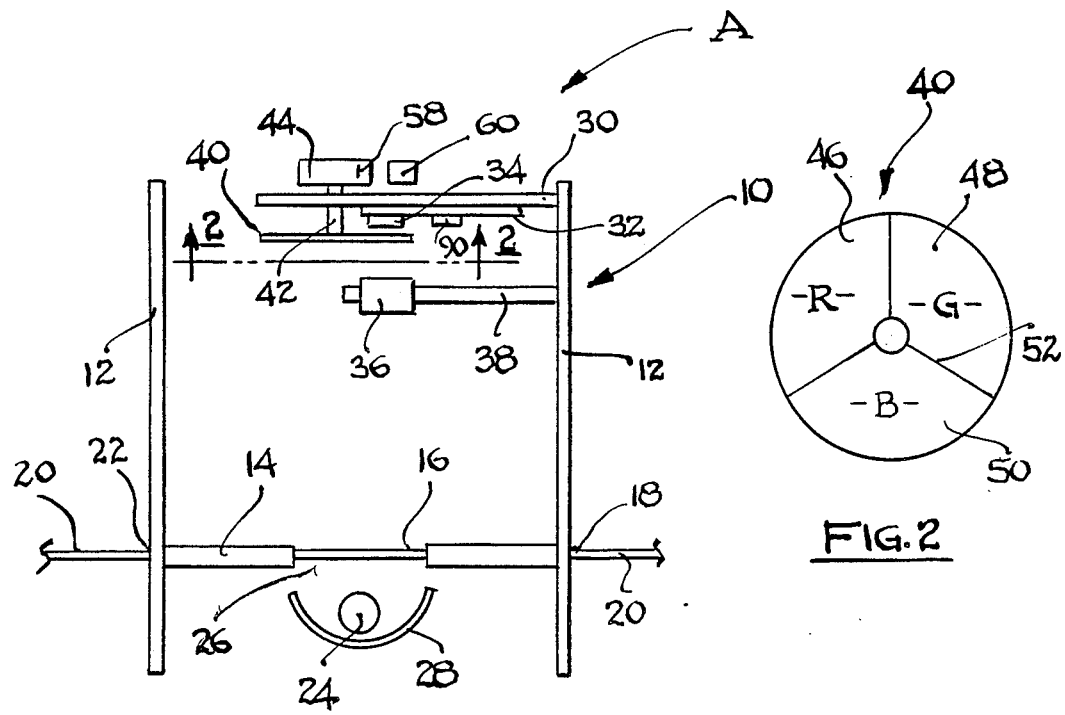
FIG. 1
FIG. 2
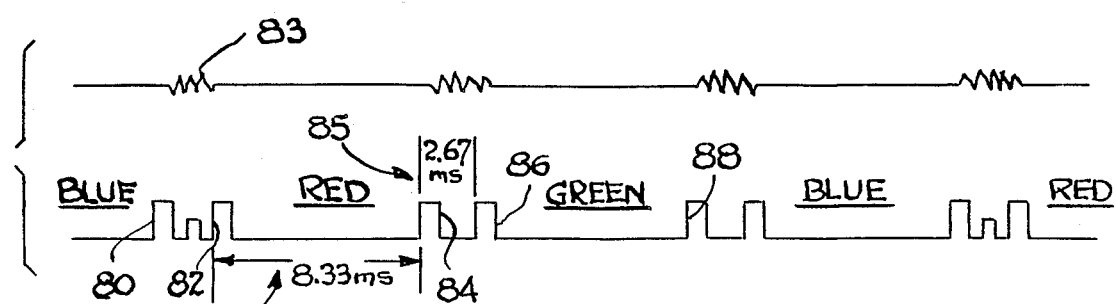
FIG. 3
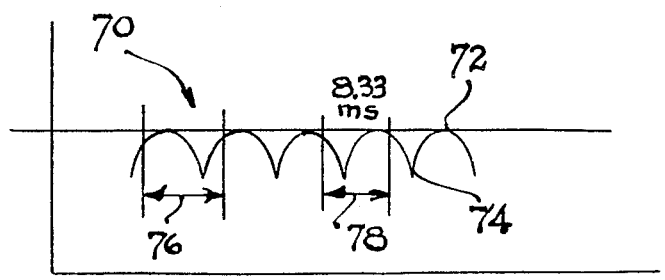
FIG. 4

APPARATUS FOR SCANNING AND RECORDING A COLOR IMAGE HAVING A SCANNING ELEMENT WITH SCANNING PERIODS EQUAL TO THE RECIPROCAL OF THE FLICKER RATE OF A LIGHT SOURCE ILLUMINATING THE COLOR IMAGE AND A ROTATING MULTI-SEGMENT COLOR FILTER

BACKGROUND OF THE INVENTION

1. Field of the Invention

This invention relates in general to certain new and useful improvements in color digitizing scanninq apparatus, and more particularly, to digitizing scanning apparatus for scanning and recording of colored images and which eliminates any light flicker from a light source which illuminates the colored image.

2. Brief Description of the Prior Art

In recent years, there has become an increased interest in utilization of electronic scanning apparatus and particularly, the so-called digitizing scanning apparatus. Apparatus of this type are adapted to scan a document, such as a printed page, and generate electrical signals representative of that material on that printed page. The electrical signals are stored and are capable of being re-accessed for re-creating the original image.

Recently, there have been some attempts to scan and store colored images, as well. One of the principle problems encountered in the scanning of colored images is the fact that the source of light used to illuminate the image has a known flicker rate. As a simple example, fluorescent tubes are effective in illuminating the image to be scanned. Essentially all fluorescent tubes have a known and essentially unremovable flicker rate.

There have been several attempts to eliminate this problem of the flicker of the light source. One of the most prominent attempts has been in the use of a very large ballast, such as a thirty kilohertz ballast. However, it may be appreciated that a ballast of this size and type not only significantly adds to the cost of the apparatus, but it presents several drawbacks, such as heat generation. As a result, means must be provided for eliminating excessive heat build-up.

When scanning a colored document for generating electrical signals representative of the colored image, it is necessary to use filters containing three colors, such as red, blue and green. One attempt to overcome the light flicker problem relied on multiple scanning movements to scan and record a single image including a complete scanning pass with a red filter, a second complete scanning pass with a blue filter, are a third complete scanning pass with a green filter. However, it may be appreciated that this type of system is quite slow in operation since at least three individual scans must be made for each document. Moreover, there is then a need to register each of the three scans.

OBJECTS OF THE INVENTION

It is, therefore, one of the primary objects of the present invention to provide a digitizing scanning apparatus for the scanning and recording of color images and which eliminates any light flicker from a light source provided to illuminate the image.

It is another object of the present invention to provide a digitizing scanning apparatus of the type stated which utilizes a multi-colored filter in order to enable the color separation of the individual colors in the image and to simultaneously eliminate light flicker from the light source illuminating the image.

It is an additional object of the present invention to provide a digitizing scanning apparatus of the type stated in which a filter having a plurality of color segments is moved between a scanning element and an image to be scanned at a rate so that it allows an exposure equal to or greater than a flicker period of a light source which illuminates the image.

It is a further object of the present invention to provide a digitizing scanning apparatus of the type stated which is relatively simple in its construction but highly efficient in its operation.

It is also an object of the present invention to provide a method for scanning a colored image and digitally recording information contained in the image and simultaneously reduce the effects of the flicker of the light source.

It is still another object of the present invention to provide a digitizing scanning apparatus of the type stated which can be used with a wide variety of different types of colored images.

With the above and other objects in view, my invention resides in the novel features of form, construction, arrangement and combination of parts presently described and pointed out in the claims.

BRIEF SUMMARY OF THE INVENTION

The present invention relates, in general terms, to a digitizing scanning apparatus for scanning and recording colored images. The apparatus generally comprises a means for illuminating the image, such as a light source. In one of the preferred embodiments, a fluorescent light source is employed. However, generally all known fluorescent light sources inherently contain a rate of flicker in the light and which thereby renders uneven light distribution over a particular image during a scanning operation.

The apparatus of the invention compensates for the uneven light distribution which would otherwise result from the flicker of the light source by the use of a multi-colored filter, as hereinafter described. A scanning element, which may adopt the form of a charged coupled device, is used for scanning the colored image and generating the digital signal representations of this colored image. These digital signal representations are of a form which can be re-converted into the colored image for print-out on a conventional printer, or for a display on a color screen monitor.

The multi-colored filter which is used is comprised of a plurality of individual color segments, and preferably comprised of three individual color segments. The filter is located between the scanning element and the colored image. Moreover, a drive means, such as an electric motor, is employed for rotating the filter at a rate equal to or less than the flicker rate of the light source and this thereby eliminates any light flicker from the illuminated colored image.

In a preferred embodiment, a lens is located between the filter and the colored image. The lens enables proper focusing and a sharper rendition of the image itself.

The scanning is caused by a relative movement between the scanning element and the image. Either the image may be moved relative to the scanning element, or the scanning element itself may be moved. In a preferred embodiment, the image is held. in a stationary form and the scanning element is moved relative to the image.

The filter which is employed in accordance with the present invention is a multi-colored filter, as aforesaid, and is transparent. The filter is preferably comprised of the three primary colors used for generating the colored image, i.e. those colors of discrete wavelength, and includes a red segment, a green segment and a blue segment. The filter is preferably in the form of a filter disk, or so-called "filter wheel".

The digital signals which ar generated by the scanning element are temporarily stored for a first portion of the period of rotation of each color segment of the filter. Moreover, the signals are then transferred to a permanent storage during only a second portion of the period of rotation of the filter. In one of the preferred embodiments of the present invention, the digital signals are stored for about 8.33 milliseconds and transferred for a time period of about 2.67 milliseconds, for a total of 11 milliseconds per filter segment as: the color filter rotates continuously.

Also in a preferred embodiment in accordance with the present invention, an indexing means is operatively associated with the filter for detecting the beginning of each new rotation of the filter wheel. This is important so that detection of the beginning of each cycle of rotation can be determined. The indexing means preferably comprises a mark on a rotatable member which rotates in coordination with the filter wheel and a sensor for detecting the mark on the rotatable member.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention. However, it is to be understood that such detailed description is not to be taken in a limiting sense.

BRIEF DESCRIPTION OF THE DRAWINGS

Having thus described the invention in general terms, reference will now be made to the accompanying drawings (one sheet) in which:

FIG. 1 is a front elevational view of a digitizing scanning apparatus constructed in accordance with and embodying the present invention;

FIG. 2 is a bottom plan view taken essentially along the plane of line 2—2 of FIG. 1 and showing a portion of the filter used in the digitizing scanning apparatus of the present invention;

FIG. 3 is a pulse diagram showing pulses which are generated and the generation of digital color image signals over a selected time frame; and FIG. 4 is a schematic illustration of a wave form and the measurement of light defined by the area of this wave form.

DETAILED DESCRIPTION OF A PREFERRED EMBODIMENT

Referring now in more detail and by reference characters to the drawings which illustrate a preferred embodiment of the present invention, A designates a digitizing scanning apparatus for scanning a colored image. In one of the preferred embodiments of the present invention, the digitizing scanning apparatus is used for the scanning of colored transparencies, as for example, photographic film transparencies. However, it should be understood that this apparatus is effective for use with essentially any type of colored image.

The apparatus A of the present invention is comprised of a frame 10 having a pair of spaced apart vertically disposed side plates 12 and which carries a film transport 14 therebetween. The actual film transport itself may be conventional in its construction and is therefore neither illustrated nor described in any further detail herein. However, the film transport 14 is provided with an opening 16 on an upper surface thereof for exposing the film transparency to a scanning device, as hereinafter described. The transport 14 is provided with an inlet end 18 at its right-hand end for receiving a strip of film transparencies 20. In addition, the transport 14 is provided with a discharge end 22 at its left-hand end, reference being made to FIG. 1 of the drawings.

The transparencies are preferably back lighted by means of a light source 24 disposed beneath the film transport 14. In this respect, the transport 14 would also be provided with an opening 26 to permit light to pass through the transparent colored image and out through the opening 16. Moreover, a mirrored reflector 28 may be employed for directing the light upwardly through the opening 26 and 16.

Any conventional light source may be used with the digitizing apparatus of the present invention. For this reason, this light source 24 is illustrated only in general schematic terms. However, in a preferred embodiment, the light source is a fluorescent lamp having red, green and blue phosphors.

Mounted on the upper end of at least one of the vertically disposed plates 12 is a horizontally extending support plate 30. Mounted on the underside of the support plate 30 is a printed circuit board 32 which contains most of the essential circuit for operation of the digitizing scanning apparatus. Mounted on the circuit board 32 is a scanning element 34, and in the preferred form of the present invention, the scanning element is a charged coupled device. Located between the image on the transparency 20 and the charged coupled device 34 is a lens 36 and which is held by a suitable lens support 38. Again, the lens itself may be conventional in construction and is therefore neither illustrated nor described in any further detail herein.

In order to obtain the necessary color separation, a color filter 40 is used with the present invention. This color filter 40 is supported centrally by a vertically disposed drive shaft 42 and which is rotated by a suitable electric motor 44. Thus, when the motor 44 is energized, it will cause rotation of the filter 40 through the drive shaft 42. The motor 44 would be suitably connected to a source of electrical power (not shown).

The filter 40 is more fully illustrated in FIG. 2 and is comprised of the primary colors, that is, colors having discrete wavelengths, such as a red segment 46, a green segment 48, and a blue segment 50. Moreover, each of these segments are generally pie-shaped and are separated from one another by radially outwardly extending lines 52. The red, green and blue color segments are preferred since they conform to the color guns of a cathode ray tube. However, it is also possible to use other filter segments, such as cyan, yellow and magenta. Furthermore, it may be desirable to use a black segment to provide a grey scale for sharper printing rendition.

In, accordance with the arrangement as illustrated in FIG. 1, it can be observed that the filter 40 is located between the scanning element 34 and the lens 36 and is thereby effectively interposed between the scanning element and the colored image. In this way, the filter will enable the color separation and detection of each of the components of the colored image for retrieval and storage and later re-presentation.

The electric motor 44 is also provided with a rotatable element. In the embodiment shown schematically, a housing portion is shown as being rotatable and is provided with an index mark 58. This mark 58 is detected by a suitable photodetector 60 which is of generally conventional construction. Thus, by the use of the photodetector, it is possible to detect each new rotation of the filter 40.

FIG. 4 illustrates a typical wave form 70 which is representative of light from a conventional light source, such as a fluorescent light. This wave form 70 has peaks 72 and valleys 74 as shown. However, it can be observed that the energy under and selected area of this wave form 70 is the same as the amount of energy represented by any other light selected portion of the curve. Thus, for example, the area represented by the distance 76 is equal to the area represented by the distance 78. Moreover, since the areas are the same, the amount of light defined by each of these areas, is also the same. It therefore follows, that under each segment of the curve, there will be an equal light distribution with any other like segment of the wave form.

By selecting a desired rate of rotation of the filter, it is possible to effectively eliminate any of the flicker contained in the light incident on the image from the light source, and thereby provide an even distribution of light on the image at all times. It may be appreciated that if there is any flicker in the light itself, this will cause an uneven illumination of the image from the light source, thereby affecting the scanning and the signals which are generated thereby.

If the light sources are powered by current having a cycle rate of 120 cycles per second, then the current will have a period of 8.33 milliseconds per segment of the filter for a three-segment filter. In like manner, if the electrical current has a cycle rate of 100 cycles per second, then the current will have a period of 10 milliseconds per segment of the filter for a three-segment filter.

During the portion of the time that each filter segment is located between the scanning element and the image, the scanning element is enabling an integration of the collected electrical signals. A portion of this time must also be devoted to the unloading or transfer of information from the scanning element. The rate of rotation of the filter segments should always be equal to or less than the flicker rate of the light source since transfer time is needed, as aforesaid. Here, the period of rotation of each filter segment will be greater than the flicker rate of the light source.

In the preferred embodiment, using a 120 cycle per second current source, the filter is rotated at about 30 revolutions per second, which constitutes about 33 milliseconds per revolution. Thus, considering the three sections of the filter, each filter segment is interposed between the image and the scanner for about an 11 millisecond interval. Inasmuch as t he flicker rate of the light has been established to be about 8.33 milliseconds, information is not transmitted during this time interval. Rather, information is transmitted for about a 2.67 millisecond interval of each 11 millisecond period for each color segment. In other words, the charged coupled device is only exposed to the image for about 8.33 milliseconds of the path for each of the color segments of the color filter.

FIG. 3 represents a train of pulses which are generated for the timing of the rotation of the filter 40 with respect to the charged coupled device 34. In this case, it can be observed that a first pulse 80 represents a beginning of an information transfer segment of 2.67 milliseconds. The second pulse 82 represents the end of that information transfer. Reference numeral 83 represents the 8.33 millisecond time period for scanning information. Reference numeral 85 represents the transfer time for transferring the first segment of scanning information to a storage from the charged coupled device. In this respect, the charged coupled device inherently contains a type of storage. Thus, after the various cells of the charged coupled device have been filled with scanning information during the 8.33 milliseconds, this information is then transferred to another temporary storage 90, such as a random-access memory. This temporary storage 90 may be mounted on and connected to the circuit board 32 as shown in FIG. 1. The distance from the second of the pulses 82 to the third of the pulses 84 represents the 8.33 milliseconds period and that is the period of time in which scanning occurs with the red filter in place. It can be observed that between the second set of pulses 86 and 88 scanning information with the green filter in place is obtained. The 2.67 millisecond distance between the pulses 84 and 86 also represents another information transfer period.

One of the unique aspects of the present invention is the fact that the device does not have to rotate the filter disk in synchronization with the actual flicker rate of the light. In fact, it is desirable to rotate the filter at a different rate than the flicker rate of the light. It is often more desirable to control the scanning rate with respect to the rate of rotation of each filter segment. Moreover, there does not have to be a perfect physical separation of the various colors in the filter.

It is important to determine the beginning of rotation of each cycle of the filter. The indexing mechanism previously described which comprises the mark 58 on a rotatable member and the photodetector 60 will provide an index pulse. In this way, it is possible to determine the beginning of each cycle.

Thus, there has been illustrated and described a unique and novel digitizing scanning apparatus for scanning and recording a colored image and which also eliminates any flicker from the light source used to illuminate the image. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention in general terms, what I desire to claim and secure by letters patent is:

1. A scanning apparatus for scanning and recording a colored image, said apparatus comprising:
   (a) means for illuminating a colored image, the illuminating means having a certain flicker rate associated therewith,
   (b) a scanning element for scanning the colored image during scanning periods and for generating electrical signals which are representative of the colored image and which can be used to recreate the colored image, each of the scanning periods being equal to the reciprocal of the flicker rate, thereby eliminating effects of the flicker on the electrical signals, and (c) a filter having a plurality of different-colored segments which is located between the scanning element and the colored image and which is rotated at a rate such that each segment of the filter is interposed between the scanning element and the colored image for a rotation period which is greater than the reciprocal of the flicker rate.

2. The scanning apparatus of claim 1 further characterized in that said colored image is a transparency and said transparency is back-lighted with respect to said scanning element.

3. The scanning apparatus of claim 1 further characterized in that the filter is light-transmissive and is comprised of a red segment, a green segment and a blue segment.

4. The scanning apparatus of claim 1 further characterized in that a lens is located between the filter and the colored image.

5. The scanning apparatus of claim 1 further characterized in that the electrical signals generated by the scanning element are integrated in the scanning element during the scanning periods, with each scanning period coinciding with a first period during the rotation period of one of the filter segments, and are transferred from the scanning element to a storage during transfer periods, with each transfer period coinciding with a second period during the rotation period of one of the filter segments.

6. The scanning apparatus of claim 5 further characterized in that the first period is about 8.33 milliseconds and the second period is about 2.67 milliseconds.

7. The scanning apparatus of claim 1 further characterized in that the scanning element is a charge-coupled device.

8. The scanning apparatus of claim 1 further characterized in that an indexing means is operatively associated with said filter for detecting the beginning of each new rotation of said filter.

9. A scanning apparatus for scanning and recording a colored image, said apparatus comprising:

(a) light source means for illuminating a colored image, the light source means having a certain flicker rate associated therewith, (b) a charge-coupled scanning element for scanning the colored image during scanning periods and for generating electrical signals which are representative of the colored image and which can be used to recreate the colored image, each of the scanning periods being equal to the reciprocal of the flicker rate, thereby eliminating effects of the flicker on the electrical signals, (c) means for causing relative movement between the scanning element and the colored image to enable scanning of the colored image, (d) a filter located between the scanning element and the colored image and having a plurality of different-colored segments, (e) a lens located between the filter and the colored image for enabling focusing of the colored image onto the scanning element, and (f) means for rotating said filter at a rate such that each segment of the filter is interposed between the scanning element and the colored image for a rotation period which is greater than the reciprocal of the flicker rate.

10. The scanning apparatus of claim 9 further characterized in that the electrical signals generated by the scanning element are integrated in the scanning element during the scanning periods, with each scanning period coinciding with a first period during the rotation of one of the filter segments, and are transferred from the scanning element to a storage during transfer periods, with each transfer period coinciding with a second period during the rotation period of one of the filter segments.

11. The scanning apparatus of claim 10 further characterized in that the first period is about 8.33 milliseconds and the second period is about 2.67 milliseconds.

12. The scanning apparatus of claim 9 further characterized in that an indexing means is operatively associated with said filter for detecting the beginning of each new rotation of said filter.

13. A method for scanning a colored image and recording information contained in said colored image, and simultaneously eliminating the effects of flicker from a light source illuminating the colored image, said method comprising:

(a) exposing the colored image to a source of light for illumination thereof, the light source having a flicker rate associated therewith, (b) causing relative movement between said colored image and a scanning element, (c) locating a filter having different-colored segments between the scanning element and the colored image, (d) simultaneously rotating the filter along with causing said relative movement to enable a scanning operation of said colored image and separation of colors therein, the filter being rotated at a rate such that each segment of the filter is interposed between the scanning element and the colored image for a rotation period which is greater than the reciprocal of the flicker rate, and (e) scanning the colored image with the scanning element during scanning periods of the scanning operation to generated electrical signals which are representative of the colored image and which can be used to recreate the colored image, wherein each of the scanning periods is equal to the reciprocal of the flicker rate, thereby eliminating effects of the flicker on the electrical signals.

14. The method of claim 13 further characterized in that the colored image is a transparency and said method comprises back-lighting the transparency.

15. The method of claim 13 further characterized in that said filter has red, blue and green segments.

16. The method of claim 15 further characterized in that the electrical signals generated by the scanning element are integrated in the scanning element during the scanning periods, with each scanning period coinciding with a first period during the rotation period of one of the filter segments, and are transferred from the scanning element to a storage during transfer periods, with each transfer period coinciding with a second period during the rotation period of one of the filter segments.

* * * * *